Nov. 11, 1969 W. DIETRICH ET AL 3,478,315

AUTOMATIC CHARACTER RECOGNITION ARRANGEMENT

Filed Nov. 3, 1965 3 Sheets-Sheet 1

INVENTORS
WALTER DIETRICH
WINFRIED SCHREMPP

BY Percy P. Lantzy
ATTORNEY

AUTOMATIC CHARACTER RECOGNITION ARRANGEMENT

Filed Nov. 3, 1965 3 Sheets-Sheet 2

INVENTORS
WALTER DIETRICH
WINFRIED SCHREMPP

BY Percy P. Lantzy
ATTORNEY

Nov. 11, 1969 W. DIETRICH ET AL 3,478,315

AUTOMATIC CHARACTER RECOGNITION ARRANGEMENT

Filed Nov. 3, 1965 3 Sheets-Sheet 3

INVENTORS
WALTER DIETRICH
WINFRIED SCHREMPP

BY Percy P. Lantzy
ATTORNEY

United States Patent Office 3,478,315
Patented Nov. 11, 1969

3,478,315

AUTOMATIC CHARACTER RECOGNITION ARRANGEMENT

Walter Dietrich, Ditzingen, Leonberg, Herdweg, Germany, and Winfried Schrempp, Washington, D.C., assignors to International Standard Electric Corporation, New York, N.Y., a corporation of Delaware Filed Nov. 3, 1965, Ser. No. 514,161
Claims priority, application Germany, Nov. 5, 1964, St 22,906
Int. Cl. G06k 9/02
U.S. Cl. 340—146.3 1 Claim

ABSTRACT OF THE DISCLOSURE

An improved scanning arrangement is provided for reducing the scanning signals to be stored two successive scanning columns in a character recognition arrangement, wherein a column-wise scanning of a character field is accomplished by plurality of discrete scanning elements, in which the vertical and horizontal line portions of the character can be evaluated, and the characters being stylized so that a column with a vertical line portion is followed by at least one column without a vertical line portion.

The present invention relates to an arrangement for the automatic recognition of characters, and in particular to an arrangement for suppressing superfluous information during scanning.

In many of the known character recognition methods the character field is resolved in a raster-shaped fashion. This may be effected with the aid of a raster of scanning or sensing elements, but may also be effected by a row of scanning elements that is moved vertically in relation to the extension of this row over the character field, so that the evaluation is rendered effective at certain times. In many cases the information per column is examined for effecting the recognition. This is suitable in cases where stylized characters are used and which are substantially composed of vertical and horizontal line or shape elements.

In such a coarse type raster, the character is required to fit into the raster and in common practice this requirement is not met. In the case of small characters (e.g. with a height of 2.70 mm. and a width of 1.70 mm.), in the case of normal large characters (e.g. with a height of 3.10 mm. and a width of 1.70 mm.) which are printed with the maximum admissible line width (e.g. 0.50 mm.), considerable portions of a line fall within the neighbouring column or row so that, during the scanning, a line falling within two neighbouring columns or rows, is indicated as black. The information obtained with respect to the second column or row is unimportant with respect to the evaluation, and may therefore be omitted. In many cases, however, this second information has a disturbing effect because it does not safeguard a reliable recognition due to the insufficient resolution.

Since the characters are narrow rather than high, and the number of rows exceeds the number of columns, the overlapping of a vertical line in two neighbouring columns is particularly critical, and may easily be the cause of the non-recognition of a character. The overlapping of a horizontal line in two neighbouring rows is not critical, because this has no affect upon the ascertainment as to whether the horizontal line is lying above, in the centre, or below within the character field. With respect to the vertical lines, however, there must be clearly distinguished e.g. between the first and the second (3 and 8) or the fourth and fifth column (4 and 9) respectively, in order to safeguard a reliable identification of the characters. In this case the columns are counted from right to left.

Recognition methods have also become known in which the above-mentioned superfluous information is suppressed in two successively following columns. According to this conventional method, the black and white transitions of the characters are ascertained in the column direction, and these transitions per scanned column, are stored as trains of pulses. If the trains of pulses of two successively following columns are alike, the information of the second column is suppressed. This is effected in that pairs of counters are provided, the number of which being equal to the maximum number of appearing pulses, into which alternately the column information is stored. During each storage cycle the contents of the respectively associated counters, of the two pairs of counters, are compared with one another; in the case of an inequality the scanned information is stored, whereas in the case of an equality the information obtained during the respective scanning cycle, is suppressed.

The present invention is likewise aimed at the problem of suppressing the superfluous or disturbing information of two successively following scanning columns. The scanning is effected in a rastered fashion in rows and columns, with the aid of a number or row of scanning elements, e.g. a row of photocells. Further it is presupposed that the characters are stylized in such a way as to be composed substantially of vertical and horizontal line or shape elements, and that a column with a vertical line portion is at least followed by a column without a vertical line portion within the same range of height. The line width of the characters is reduced by the novel arrangement in such a way that it can be unambiguously assigned to one of the columns, so that a small number of columns is sufficient for both the evaluation and recognition.

According to the invention, and for the purpose of storing the dark-spot (black) signal, a bistable storage element is connected to each output circuit of each scanning element, with the two outputs of the storage element, in turn, being connected to the two inputs of a further bistable storage of the shift register type; moreover, between the output circuit and the first storage there is provided an AND-circuit and, finally, the outputs of the second storages which are marked at "white," of respectively three neighbouring scanning tracks, are connected to the inputs of an AND-circuit associated with the medium track, via an OR-circuit. The storing into the second storage is effected during the intervals between two column cycles during which there is effected the storing into the first storage.

The arrangement may be simplified if the horizontal lines are not involved in the recognition process. Hence, in this case, the black or dark-spot information relating to the horizontal lines may be suppressed; in most cases it is advisable to do this, because they may have a disturbing effect during the evaluation of only vertical line portions. In this case the OR-circuit may be omitted, so that the outputs of the secondary storages are connected directly to the respective AND-circuit. If the characters are strongly stylized, and if, in particular, they have sharp edges at the line or shape elements to be evaluated, it is sometimes possible to further simplify the arrangement, in that to the output of the secondary storage only one scanning track is connected to the associated AND-circuit.

It is evident that with the aid of this novel arrangement superfluous information is suppressed, so that the expenditure for the storage and recognition may be kept relatively low. The evaluation of the horizontal lines may be effected in the conventional way of charging a capacitor or with the aid of a column counter.

The invention will now be explained in detail with reference to an embodiment shown in FIGS. 1 to 5 of the accompanying drawings, in which.

Figure 1:
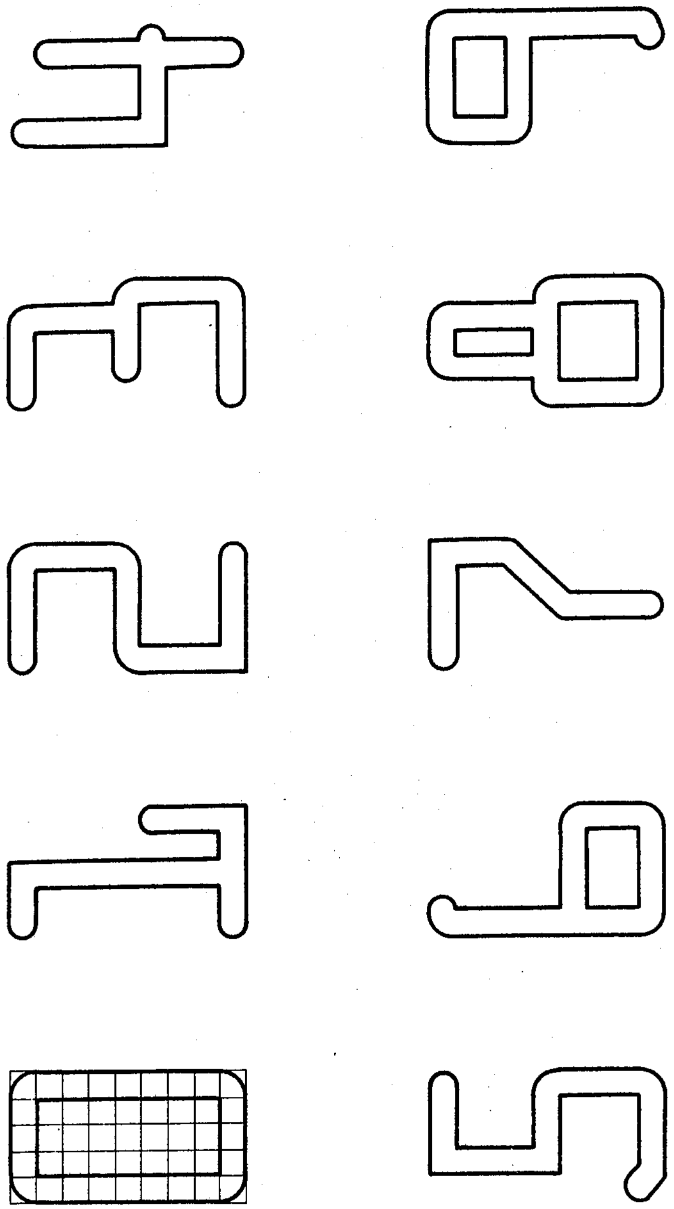
FIG. 1 shows the digits 0 to 9 to be evaluated.

Referring now to FIG. 1 there are shown the digits 0 to 9 which are to be evaluated; as is shown with respect to the numeral 0, the character field is divided into a raster containing five columns and nine rows. Moreover, it may be taken from the set of digits or numerals, that one column with a black (dark-spot) information is at least followed by one column with a white information; the black information, thereby, each time refers either to a part or to the entire column.

Figure 2:
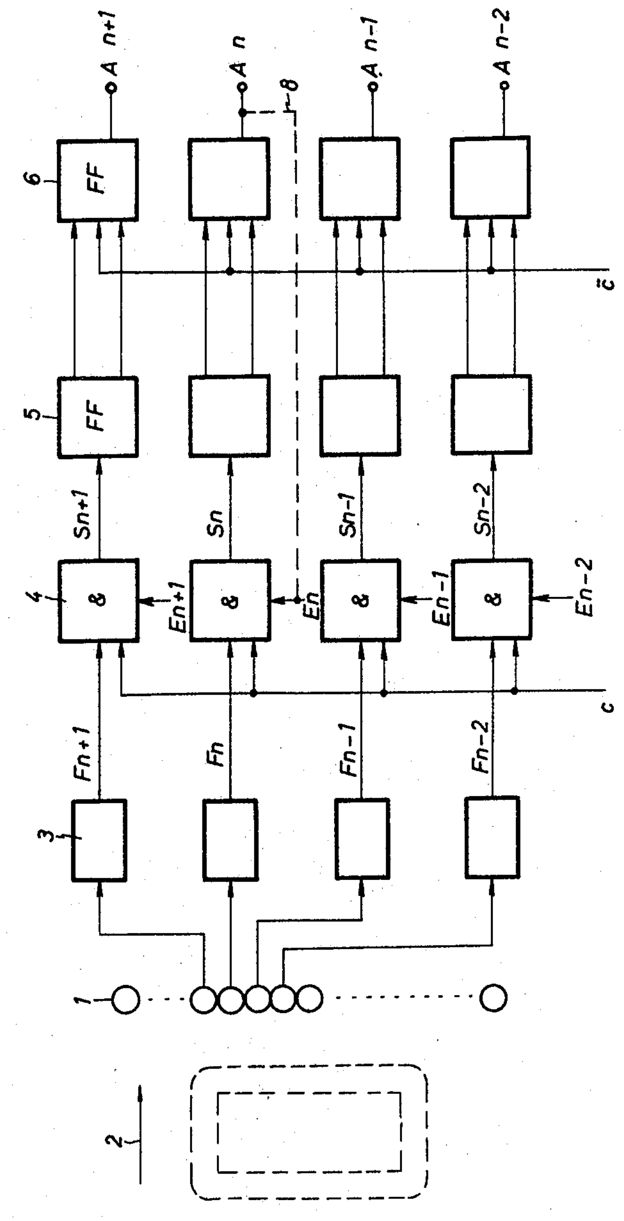
FIG. 2 is schematically shows the arrangement according to the invention.

FIG. 2 shows a block diagram of the novel arrangement. The scanning is only shown in principle, details have been omitted since conventional arrangements may be used to this end, the description of which is not necessary for explaining the present invention. Furthermore, the evaluating circuits are omitted, because they are likewise of no importance in this respect.

Accordingly, only the row of photocells 1 is shown of the scanning arrangement, with the aid of which the record medium is scanned, which is being moved in the direction as indicated by the arrow 2; in the present case it is assumed that the digit 0 is just about to be evaluated, which is indicated by the dash-lined digit (numeral) 0. Due to the direction of movement of the record medium, the columns are counted from right to left. Each of the photocells is connected to an output circuit 3 which, as a rule, contains an amplifier and a threshold circuit. Since such types of circuit arrangements are well-known in the art and are frequently used, there is not included a detailed explanation. Each output circuit 3 is connected via an AND-gate 4, to an input storage 5. Since the output signals are digitalized, that is, only exist in the case of a predetermined black (dark-spot) information of the scanned surface element (shape element), and are zero if below this black content, it is sufficient to provide a bistable storage element, e.g. a flip-flop circuit, for the storage purpose. The storing is effected in the presence of a black signal, and if the input requirements are met at the AND-circuit 4.

Both of the outputs of the flip-flop 5 are connected to a further bistable storage unit, so that the flip-flops 6 will assume the same condition as the flip-flops 5. The outputs $A_n$ are marked if a white signal is stored in the respective flip-flop 6.

Figure 3:
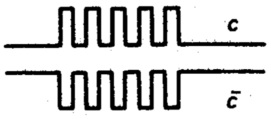
FIG. 3 shows the storage cycles $c$ and $\bar{c}$.

The characters are scanned in a columnwise manner by the action of the row of photocells 1 with the column timing cycle $c$ being produced by a clock-pulse generator (timing generator). The column timing pulse $c$ also effects the unblocking of the AND-circuits 4. During the inverse timing pulse $\bar{c}$, whose positive leading edge is displaced by one pulse width with respect to the timing pulse $c$, the contents of the storages 5 are transferred to the storages 6. FIG. 3 shows the two trains of timing pulses $c$ and $\bar{c}$ which are staggered with respect to one another.

It is assumed that the output signals of the output circuit 3 and of the AND-circuits 4 are positive if black is being scanned; the output signals of the flip-flops 6 are negative if black is being stored-in, hence positive if white has been stored. As may be taken from FIG. 2, the AND-circuits 4 and the flip-flops 5 are set by the action of positive signals, whereas the flip-flops 6 respond to both signal directions, this is because they are connected to the storages 5 in the manner of a shift register.

The storing of the output signal $F_i$ ($i=1, 2 \ldots n, n+1 \ldots$) into the associated storage 5 is effected via the AND-circuits 4, if simultaneously there exists both the storage timing pulse $c$ and the input signal $E_n$. The storing into the flip-flops 6 is effected by the inverse storage pulse $\bar{c}$.

Figure 4:
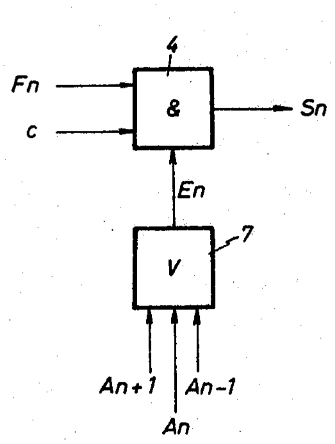
FIG. 4 shows the input E of the AND-circuit in FIG. 2 for evaluating vertical lines—without suppressing the horizontal lines.

The significance of signal $E_n$ may be taken from FIG. 4. This FIG. 4 shows that three outputs A are connected via the OR-circuit 7, to the AND-circuit 4 the outputs of the storages 6 of the two neighbouring tracks are assembled with the output of the storage 6 of the respective track under consideration, via the OR-circuit 7. Accordingly, the AND-circuit 4 only responds and enables the storing of a block (dark-spot) signal into the respective storage device 5, of:

(1) none or
(2) one or
(3) two of the three neighbouring scanning tracks in the preceding column a black information has been detected. On the other hand, no storing is effected if black has been detected on all three of the tracks under consideration.

Case 1 is always given at the beginning of the scanning of a character.

Case 2 applies to the scanning of a horizontal line.

Case 3 will result whenever the upper or the lower end of a vertical line is being scanned.

The case in which black is being scanned on three neighbouring tracks will result when carrying out the scanning along a vertical line.

In this way it is accomplished that solid printed vertical lines are only stored into one column of the electric storage device, and that all horizontal lines following the end of a vertical line, are completely detected. The detection of such horizontal lines commencing in the centre of a vertical line effects the blanking of the first point or spot following the vertical line. This is the case in respect of the "4" and "9"; however, since all other horizontal lines are completely detected, the somewhat smaller reliability with respect to the detection of these horizontal lines, is acceptable because of the simple arrangement.

The described arrangement may be regarded as one example relating to a number of possibilities as to how the latching may be eliminated in the case of horizontal lines. Thus, for example, by a somewhat higher expenditure, the corners can be better recognized if the requirement says that a black (dark-spot) signal is only stored if either no track or the track $n$ and $n+1$, or the track $n$ and $n-1$ in the preceding column contain the black information. These requirements may still be further elaborated and improved when considering the number of scanning tracks allotted to one vertical line.

There will result a simplification of the described arrangement if only the vertical line portions are involved in the recognition process. Hence, in this case, all horizontal line portions following a vertical element in the course of the scanning, may be suppressed. Incidentally, in this case each output A is connected directly and only to the input $E_n$, as indicated by the dash—line 8. This means to imply that a black information can only be stored into the storage 5 if a white signal has been stored in the associated storage device 6. If, however, a black signal has been stored in the storage device 6, then the storing of an information will be suppressed during the next following column timing pulse, i.e. in the next column. Accordingly, vertical lines which are printed thicker than would correspond to one column division, are only stored as black in the first column, whereas white is being stored into the successively following column. Accordingly, the line width of the vertical lines is reduced, but all information of the vertical lines is maintained, because this information never appears in two neighbouring columns.

In this arrangement the points or spots of all horizontal lines, following the storing of a black information, are suppressed, in other words: white is stored into the corresponding flip-flop 5, because the AND-circuit 4 has been blocked by the flip-flop 6. By the next successive column timing pulse *c*, also the flip-flop 6 is reset to white, so that the successively following third point or spot of a horizontal line will again be stored as black into the flip-flop 5. Accordingly, in this arrangement e.g. the upper horizontal line of the "0" in FIG. 1 is stored with the five points or spots, as beginning from the right, with the black-white - black - white - black succession being successively stored into the flip-flop 5. The black point or spot of the horizontal line in the third column may either be easily eliminated in the recognition circuit, because it is always substantially smaller than a vertical line, or at the scanning, the outputs of several neighbouring photocells are assembled additively in the well-known manner with the aid of resistors, so that at the output of the resistors a black-signal will only appear if such a number of neighbouring photo diodes which are covered up by a vertical line, indicate "black." In this case the horizontal lines are already suppressed during the scanning, and the inventive arrangement will then serve to reduce the line width of solid or fat printed vertical lines to the width of one column and, consequently, to reduce the number of columns to be scanned.

Figure 5:
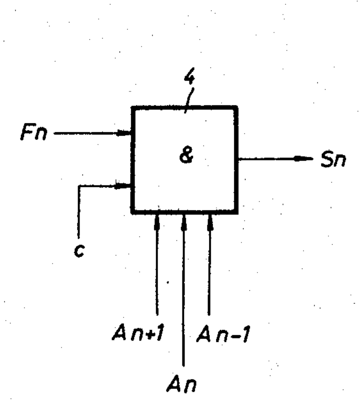
FIG. 5 shows the input E of the AND-circuit in FIG. 2 for evaluating vertical lines by suppressing the horizontal lines.

This simplified type of arrangement is insufficient in cases where the rounded-off corners of the digits or numerals are poorly printed. Thus, for example, the photo diode in FIG. 2 associated with the $(n+1)$th row, could only be covered up by the rounded-off corner of the "0" in the upper right to such an extent and only at a time position which is later than the storage timing pulse *c*, that it would indicate "black," and this information would then only be detected by the next storage timing pulse, and would be stored as "black" into the second column. In order to avoid this, the response of the AND-circuit 4 is made dependent upon the fact that in the scanning track under consideration, as well as in the two neighbouring scanning tracks of the preceding column, no black information has been detected. The storing of a black information is thus only performed if "white" exists in the preceding column at least with respect to three neighbouring tracks. FIG. 5 shows the AND-circuit 4 with the corresponding input requirements for producing an output signal at the output $S_n$. Also in this case parts of the horizontal lines are stored-in as well which, later on, and as already mentioned hereinbefore, may again be eliminated either in the recognition circuit, or by a resistance addition during the scanning.

What is claimed is:

1. In an arrangement for character recognition by a column-wise scanning of a character field by a plurality of discrete scanning elements in which the vertical and horizontal line portions of the characters can be evaluated, the characters being stylized so that a column with a vertical line portion is followed by at least one column without a vertical line portion, the improved scanning arrangement for reducing the scanning signals to be stored in two successive scanning columns comprising:

a row of photocells (1), each of the photocells being connected to one of a plurality of output circuits (3) for producing an output signal (F*n*) in the case of a predetermined black information of a scanned recording medium;

a plurality of input bistable storages (5);

a plurality of AND-gates (4), each of said AND-gates being associated with one of said output circuits (3) and one of said input storages (5), so that in response to inputs (F*n*, C, E*n*) said one AND-gate produces an output (S*n*) for storing in said storage (5);

a plurality of output bistable storages (6), each of said storages (6) having both of its inputs connected to both of the outputs of an associated one of said input storages (5), and each of said storages (6) producing an output signal (A*n*) when a "white" signal is stored therein; and a plurality of OR-circuits (7), each of said OR-circuits being coupled to one of said AND-gates (4) and producing an enabling signal (E*n*), and each of said OR-circuits having three inputs coupled from three neighboring output storage (6) whereby, unless none of the associated output signals (A*n*−1, A*n*, A*n*+1) is marked in a preceding column, the storage of a black signal into the respective storage (5) is enabled.

References Cited

UNITED STATES PATENTS

| | | | |
|---|---|---|---|
| 3,104,369 | 9/1963 | Rabinow | 340—146.3 |
| 3,140,466 | 7/1964 | Greanias | 340—146.3 |
| 3,177,352 | 5/1965 | Hamburgen | 340—146.3 |
| 3,201,751 | 8/1965 | Rabinow | 340—146.3 |
| 3,243,776 | 3/1966 | Abbott | 340—146.3 |
| 3,289,161 | 11/1966 | Gattner | 340—146.3 |
| 3,290,651 | 12/1966 | Paufve | 340—146.3 |
| 3,293,604 | 12/1966 | Klein | 340—146.3 |

MAYNARD R. WILBUR, Primary Examiner

S. SHEINBEIN, Assistant Examiner